US012791877B2

(12) United States Patent
Li et al.

(10) Patent No.: US 12,791,877 B2
(45) Date of Patent: Nov. 10, 2026

(54) LIQUID CRYSTAL DIMMING EYEGLASSES

(71) Applicant: Wicue USA INC., Santa Clara, CA (US)

(72) Inventors: Fenghua Li, Santa Clara, CA (US); Bingtong Zhu, Santa Clara, CA (US); Hui Liu, Santa Clara, CA (US)

(73) Assignee: Wicue USA INC.

( * ) Notice: Subject to any disclaimer, the term of this patent is extended or adjusted under 35 U.S.C. 154(b) by 294 days.

(21) Appl. No.: 18/603,027

(22) Filed: Mar. 12, 2024

(65) Prior Publication Data

US 2025/0291207 A1 Sep. 18, 2025

(51) Int. Cl.
*G02C 7/10* (2006.01)
*G02C 5/02* (2006.01)

(52) U.S. Cl.
CPC ............... *G02C 7/101* (2013.01); *G02C 5/02* (2013.01); *G02C 2200/32* (2013.01)

(58) Field of Classification Search
CPC ... G02C 7/02; G02C 7/12; G02C 7/10; G02C 7/101; G02C 7/104; G02C 7/063; G02C 11/00; G02C 11/10; G02C 11/06; G02C 5/00; G02C 5/02; G02C 5/008; G02C 5/001; G02C 5/14; G02C 5/22; G02C 2200/32; G02F 1/133; G02F 1/1333; G02F 1/1343; G02F 1/13306; G02F 1/133308; G02F 1/13718; G02F 1/13737; G02F 1/133305; G02F 1/13725; G02F 1/134309
USPC ...... 351/44, 41, 111, 121, 158, 124, 159.03, 351/159.62, 159.39; 359/265, 245, 322, 359/275, 630–632
See application file for complete search history.

(56) References Cited

U.S. PATENT DOCUMENTS

| | | | | |
|---|---|---|---|---|
| 6,349,001 | B1 * | 2/2002 | Spitzer | G02C 11/10 351/158 |
| 11,213,429 | B1 * | 1/2022 | Li | G02F 1/1337 |
| 2004/0108984 | A1 * | 6/2004 | Ogasawara | G02F 1/29 |
| 2020/0089025 | A1 * | 3/2020 | Li | G02C 11/10 |

* cited by examiner

*Primary Examiner* — Jie Lei
(74) *Attorney, Agent, or Firm* — Birchwood IP

(57) ABSTRACT

This application discloses a liquid crystal dimming eyeglasses, comprising a frame, lenses, a liquid crystal film, and a circuit board. The lens is positioned within the frame; the liquid crystal film is attached to the lens and includes a first conductive layer, a second conductive layer, and a liquid crystal layer. The first and second conductive layers are arranged opposite to each other; the first conductive layer is equipped with an inner ring portion, an outer ring portion, and an etched portion, with the outer ring portion partially surrounding the inner ring portion. The etched portion is located between the inner ring portion and the outer ring portion, ensuring insulation between these two parts. The liquid crystal layer is situated between the inner ring portion and the second conductive layer. The circuit board is electrically connected to both the inner ring portion and the second conductive layer.

10 Claims, 8 Drawing Sheets

LIQUID CRYSTAL DIMMING EYEGLASSES

TECHNICAL FIELD

This application relates to a field of eyeglass technology, and in particular, to a type of liquid crystal dimming eyeglasses.

BACKGROUND

Traditional dimming eyeglasses primarily operate on the principle of chemical photochromism (incorporating silver halides). These types of eyeglasses automatically darken upon encountering ultraviolet light outdoors due to a chemical reaction and return to a transparent state indoors or in the absence of ultraviolet light. However, their disadvantage lies in the extremely slow response time, failing to meet people's needs for rapid switching of light transmission in dimming eyeglasses. Liquid crystal dimming eyeglasses precisely meet this need for rapid transition in light transmittance. Nonetheless, during the production process of liquid crystal dimming eyeglasses, the upper and lower conductive layers of the liquid crystal film are prone to short-circuiting. For instance, when cutting multiple liquid crystal films from a mother board, conductive powder is generated. If this conductive powder contaminates the cut edges of the liquid crystal film, it can create a conductive path between the upper and lower conductive layers. Similarly, during the assembly process of the liquid crystal dimming eyeglasses, if the cut edges of the liquid crystal film come into contact with other conductive contaminants, it can also lead to the conduction between the upper and lower conductive layers.

Therefore, there is an urgent need for a technological solution that can address the aforementioned issues.

SUMMARY

An objective of this application is to provide a type of liquid crystal dimming eyeglasses, aimed at improving the technical issue where the upper and lower conductive layers of the liquid crystal film in existing liquid crystal dimming eyeglasses are prone to short-circuiting, leading to operational anomalies.

To achieve the above objective, this application provides a type of liquid crystal dimming eyeglasses, including:

A frame;

A lens, positioned within said frame;

A liquid crystal film, attached to said lens, the liquid crystal film including a first conductive layer, a second conductive layer, and a liquid crystal layer, where the first conductive layer and the second conductive layer are arranged opposite to each other; the first conductive layer has an inner ring portion, an outer ring portion, and an etched portion, the outer ring portion partially surrounds the inner ring portion, the etched portion is located between the inner ring portion and the outer ring portion, the inner ring portion and the outer ring portion are insulated from each other by the etched portion, the liquid crystal layer is located between the inner ring portion and the second conductive layer; and A circuit board, electrically connected to the inner ring portion and the second conductive layer, respectively.

Alternatively, in some embodiments of this application, the liquid crystal dimming eyeglasses further include:

A wiring, at least partially positioned within said frame, the circuit board is electrically connected to the inner ring portion and the second conductive layer through the wiring.

Alternatively, in some embodiments of this application, the first conductive layer has a first binding part, the etched portion has an opening, the first binding part is correspondingly arranged to the opening, the first binding part is electrically connected to the inner ring portion; the eyeglasses further include a first conductive adhesive, the wiring is bound to the first binding part through the first conductive adhesive;

The second conductive layer has a second binding part, the eyeglasses further include a second conductive adhesive, the wiring is bound to the second binding part through the second conductive adhesive.

Alternatively, in some embodiments of this application, the width of the first conductive adhesive is less than the width of the opening.

Alternatively, in some embodiments of this application, the liquid crystal film further includes sealing frame adhesive, the sealing frame adhesive is located between the first conductive layer and the second conductive layer, the sealing frame adhesive is arranged around the liquid crystal layer; a part of the etched portion is correspondingly arranged to the sealing frame adhesive, another part of the etched portion extends to the outside of the sealing frame adhesive.

Alternatively, in some embodiments of this application, the eyeglasses include two said lenses and two said liquid crystal films, the two lenses are spaced apart in the frame, the lens and the liquid crystal film correspond one to one, each liquid crystal film is attached to the corresponding lens; or, The eyeglasses include one said lens and one said liquid crystal film, the liquid crystal film is attached to the lens, the liquid crystal film has two light-transmitting areas, the two light-transmitting areas correspond respectively to the left and right eyes of the wearer.

Alternatively, in some embodiments of this application, the frame includes a front frame and a rear frame, the front frame is assembled to the rear frame, the lens is clamped between the front frame and the rear frame.

Alternatively, in some embodiments of this application, the front frame has a slot, the rear frame has a snap, the snap is snapped and connected into the slot; or, The rear frame has a slot, the front frame has a snap, the snap is snapped and connected into the slot.

Alternatively, in some embodiments of this application, the liquid crystal dimming eyeglasses further include:

Temples, hinged to said frame, the circuit board is located within said temples;

A battery, located within said temples, the battery is electrically connected to the circuit board.

Alternatively, in some embodiments of this application, the temples include a body and a cover, the body is hinged to said frame, the cover is assembled to said body, the body and the cover together form a housing cavity, the circuit board and the battery are located within the housing cavity.

In the liquid crystal dimming eyeglasses of this application, the first conductive layer of the liquid crystal film is designed with an etched portion. The etched portion divides the first conductive layer into an inner ring portion and an outer ring portion that are insulated from each other, with the outer ring portion partially surrounding the inner ring portion. When the cut surface of the liquid crystal film gets contaminated with conductive powder, even if the outer ring portion of the first conductive layer becomes conductively connected to the second conductive layer through the conductive powder, the insulation between the outer ring portion and the inner ring portion of the first conductive layer ensures that the inner ring portion will not conduct with the second conductive layer. Therefore, the liquid crystal film remains unaffected and can function normally.

List of reference signs:

| Reference Number | Component Name |
|---|---|
| 100 | Frame |
| 110 | Front Frame |
| 111 | Slot |
| 120 | Rear Frame |
| 121 | Snap |
| 200 | Temples |
| 210 | Body |
| 220 | Cover |
| 230 | Housing Cavity |
| 300 | Lens |
| 400 | Liquid Crystal Film |
| 410 | First Flexible Substrate Layer |
| 420 | First Conductive Layer |
| 421 | Etched Portion |
| 4211 | Opening |
| 422 | Outer Ring Portion |
| 423 | Inner Ring Portion |
| 424 | First Binding Part |
| 430 | Sealing Frame Adhesive |
| 440 | Liquid Crystal Layer |
| 450 | Second Conductive Layer |
| 451 | Second Binding Part |
| 460 | Second Flexible Substrate Layer |
| 470 | Light-transmitting Area |
| 500 | Circuit Board |
| 600 | Wiring |
| 700 | First Conductive Adhesive |
| 800 | Battery |
| 900 | Second Conductive Adhesive |

ED DESCRIPTION

Hereinafter, with reference to the drawings in the embodiments of the present disclosure, a clear and complete description of the schemes in the embodiments of the present disclosure will be provided. It should be apparent that the described embodiments are only a portion of the embodiments of the present disclosure, not all of them. Based on the embodiments of the present disclosure, all other embodiments that those skilled in the art obtain without making inventive contributions fall within the scope of protection of the present disclosure.

Embodiment 1

Figure 1:
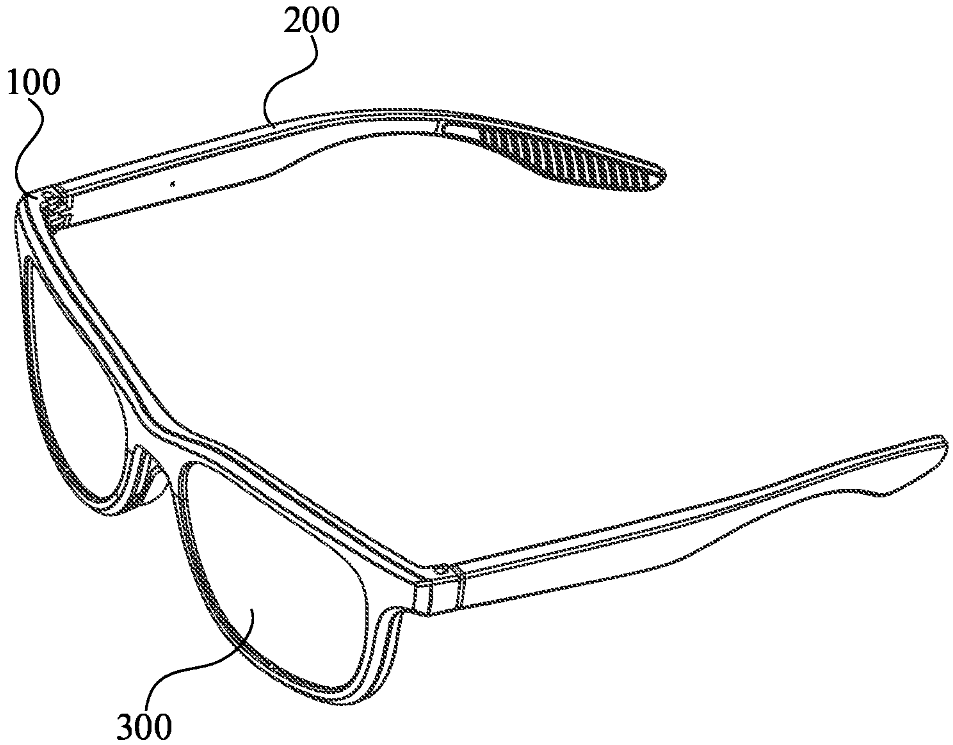
FIG. 1 is a schematic diagram of the three-dimensional structure of the liquid crystal dimming eyeglasses of this application.
Figure 2:
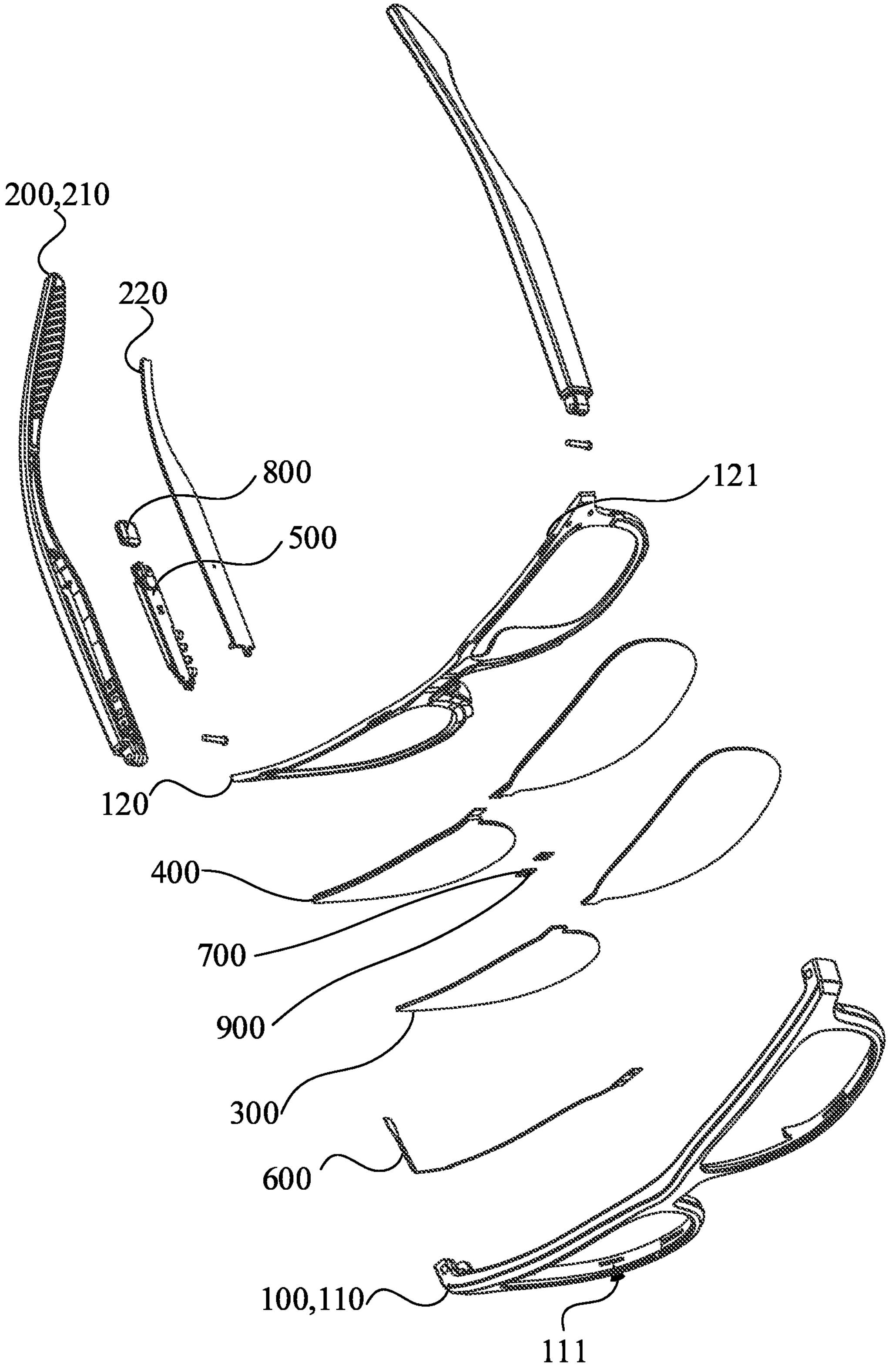
FIG. 2 is an exploded structural schematic diagram of the liquid crystal dimming eyeglasses of the first embodiment of this application.

Please refer to FIG. 1, the first embodiment of this application provides a liquid crystal dimming eyeglasses. As shown in FIG. 2, the liquid crystal dimming eyeglasses include a frame 100, lenses 300, a liquid crystal film 400, and a circuit board 500. The lenses 300 are positioned within the frame 100, and the liquid crystal film 400 is attached to the lenses 300. The circuit board 500 is electrically connected to the liquid crystal film 400. In this structure, under the drive of the circuit board 500, the liquid crystals in the liquid crystal film 400 can deflect, thereby achieving dimming. In the first embodiment of this application, the liquid crystal dimming eyeglasses include two lenses 300 and two liquid crystal films 400. The two lenses 300 are spaced within the frame 100, and each lens 300 corresponds to a liquid crystal film 400, with each liquid crystal film 400 attached to the corresponding lens 300.

Figure 3:
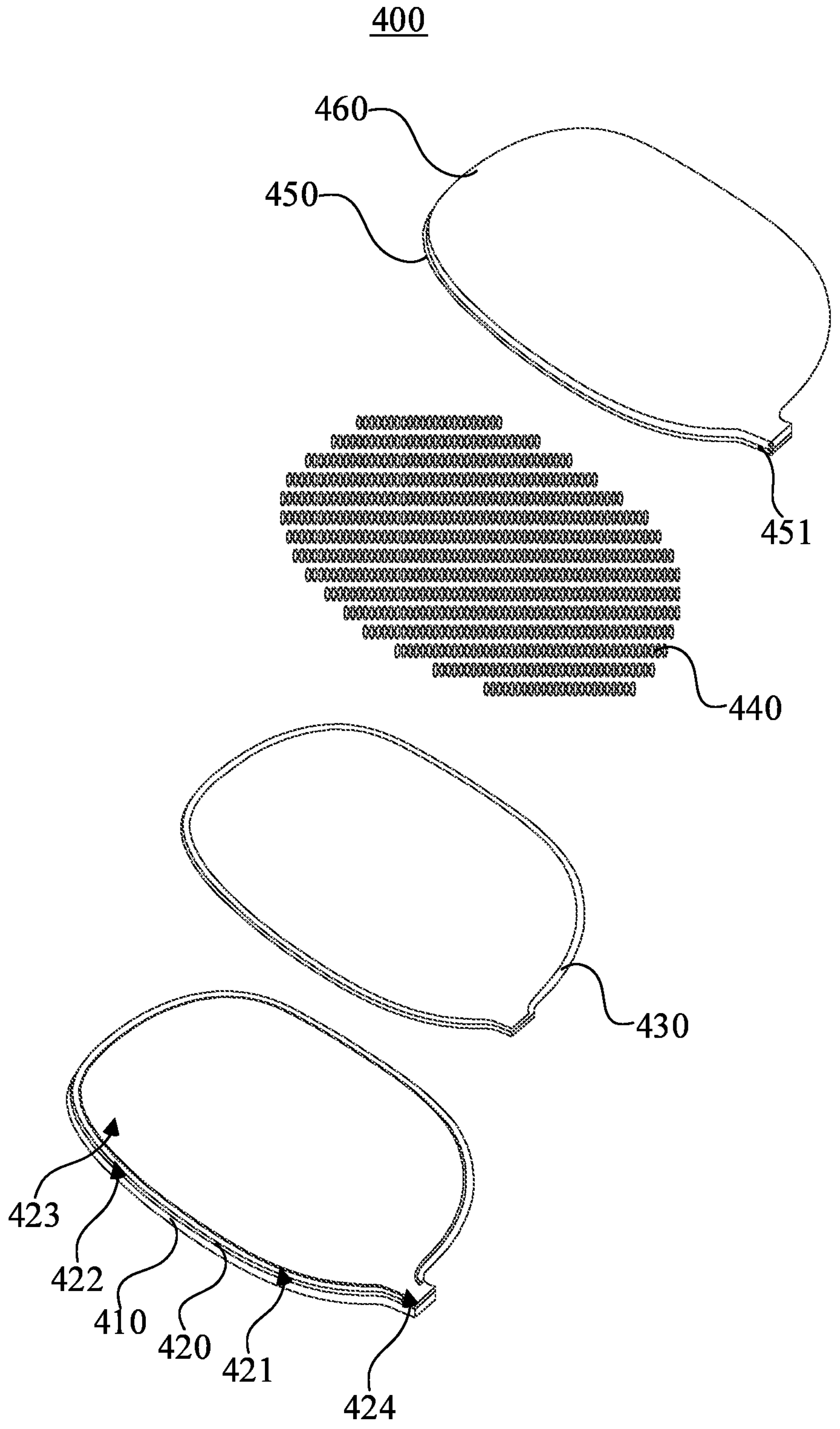
FIG. 3 is an exploded structural schematic diagram of the liquid crystal film of the first embodiment of this application.
Figure 4:
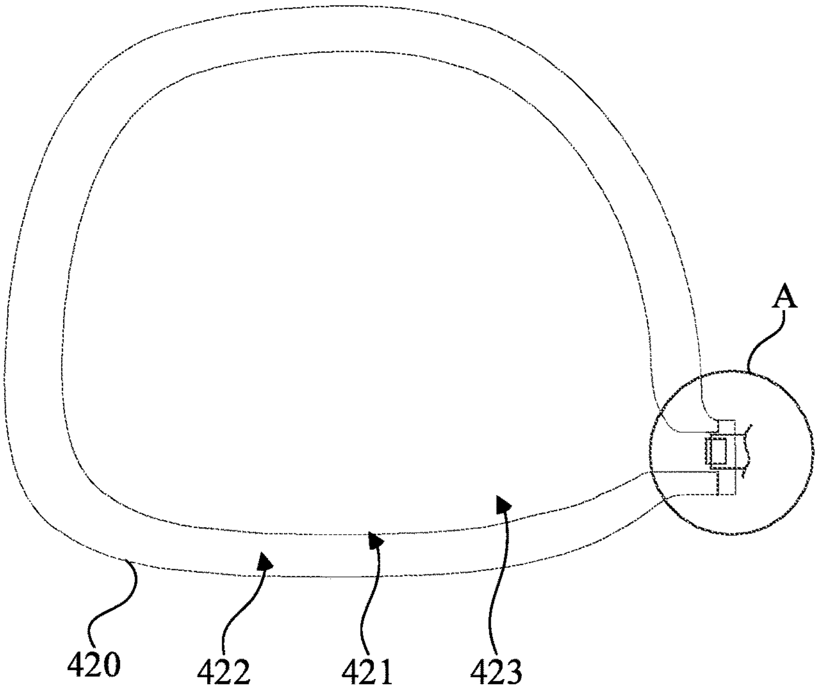
FIG. 4 is a plan schematic diagram of the first conductive layer, the first conductive adhesive, and the wiring of the first embodiment of this application.
Figure 5:
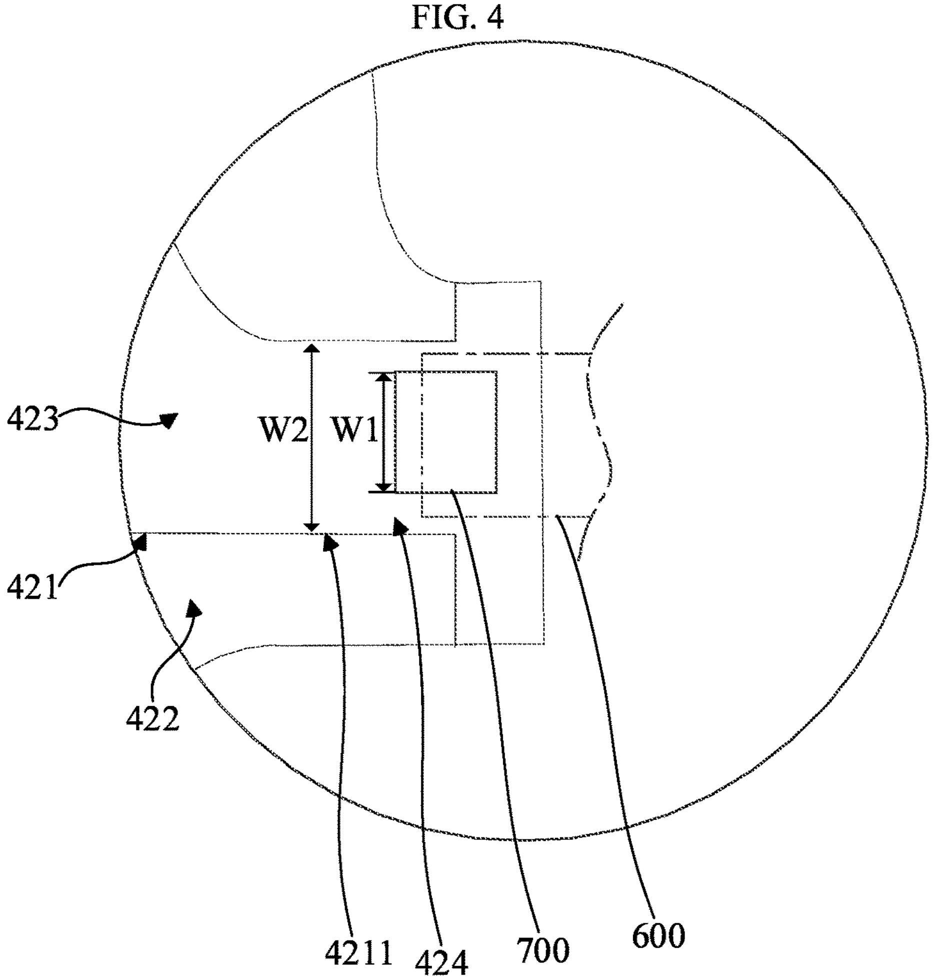
FIG. 5 is an enlarged schematic diagram of Area A in FIG. 4.

Specifically, as shown in FIGS. 3 to 5, the liquid crystal film 400 includes a first conductive layer 420, a second conductive layer 450, and a liquid crystal layer 440. The first conductive layer 420 and the second conductive layer 450 are oppositely arranged. The first conductive layer 420 has an inner ring portion 423, an outer ring portion 422, and an etched portion 421. The outer ring portion 422 partially surrounds the inner ring portion 423. The etched portion 421 is located between the inner ring portion 423 and the outer ring portion 422, insulating the inner ring portion 423 from the outer ring portion 422. The liquid crystal layer 440 is situated between the inner ring portion 423 and the second conductive layer 450. In this embodiment, the circuit board 500 is electrically connected to both the inner ring portion 423 and the second conductive layer 450. The circuit board 500 can control the deflection angle of the liquid crystals by adjusting the voltage difference between the inner ring portion 423 and the second conductive layer 450, thus achieving dimming.

In the liquid crystal dimming eyeglasses of this application, the first conductive layer 420 of the liquid crystal film 400 has an etched portion 421. The etched portion 421 divides the first conductive layer 420 into mutually insulated inner ring portion 423 and outer ring portion 422. When the cross-section of the liquid crystal film 400 gets contaminated with conductive powder, even if the outer ring portion 422 of the first conductive layer 420 becomes conductively connected to the second conductive layer 450 through the conductive powder, the insulation between the outer ring portion 422 and the inner ring portion 423 prevents the inner ring portion 423 from conducting with the second conductive layer 450, ensuring that the liquid crystal film 400 remains unaffected and can function normally.

It should be noted that the etched portion 421 can be an etching groove, which may, but is not limited to, be formed by laser etching.

Specifically, as shown in FIG. 3, the liquid crystal film 400 also includes a first flexible substrate layer 410 and a second flexible substrate layer 460. The first conductive layer 420 is located on one side of the first flexible substrate layer 410, which is on the side of the first conductive layer 420 that is away from the liquid crystal layer 440. The second conductive layer 450 is located on one side of the second flexible substrate layer 460, which is on the side of the second conductive layer 450 that is away from the liquid crystal layer 440.

Specifically, as shown in FIGS. 2 and 3, the liquid crystal dimming eyeglasses also include a wiring 600. The wiring 600 is at least partially positioned within the frame 100, and the circuit board 500 is electrically connected to both the inner ring portion 423 and the second conductive layer 450 through the wiring 600. The wiring 600 is a flexible circuit board, which has the advantages of small size and light weight, conducive to the miniaturization and lightweight design of the liquid crystal dimming eyeglasses, thus improving the user's wearing experience.

Specifically, as shown in FIGS. 4 and 5, the first conductive layer 420 has a first binding part 424, the etched portion 421 has an opening 4211, and the first binding part 424 is correspondingly arranged to the opening 4211 and can be electrically connected to the inner ring portion 423. The liquid crystal dimming eyeglasses also include a first conductive adhesive 700, which may be, but is not limited to, an anisotropic conductive adhesive, silver paste, or other conductive media. The wiring 600 is bound to the first binding part 424 through the first conductive adhesive 700. This structure ensures a stable electrical connection between the wiring 600 and the first binding part 424. In this embodiment, the second conductive layer 450 has a second binding part 451, and the liquid crystal dimming eyeglasses also include a second conductive adhesive 900, with the wiring 600 bound to the second binding part 451 through the second conductive adhesive 900.

It should be noted that, in FIGS. 4 and 5, the first conductive adhesive 700 covers the first binding part 424, with the dashed line representing the wiring 600, which covers the side of the first conductive adhesive 700 that is away from the first binding part 424.

Specifically, as shown in FIG. 5, the width W1 of the first conductive adhesive 700 is less than the width W2 of the opening 4211. This structure prevents the first conductive adhesive 700 from conducting between the outer ring portion 422 and the first binding part 424, thereby preventing a short circuit between the inner ring portion 423 and the outer ring portion 422.

Specifically, as shown in FIGS. 3 to 5, the liquid crystal film 400 also includes a sealing frame adhesive 430. The sealing frame adhesive 430 is located between the first conductive layer 420 and the second conductive layer 450 and is arranged around the liquid crystal layer 440. A part of the etched portion 421 corresponds to the sealing frame adhesive 430, and another part of the etched portion 421 extends to the outside of the frame adhesive 430. This structure, by having a part of the etched portion 421 correspond to the sealing frame adhesive 430 and another part of the etched portion 421 extending to the outside of the frame adhesive 430, increases the area of the inner ring portion 423, which is beneficial for improving the aperture ratio of the liquid crystal film 400.

Specifically, as shown in FIG. 2, the frame 100 includes a front frame 110 and a rear frame 120. The front frame 110 is assembled to the rear frame 120, with the lenses 300 clamped between the front frame 110 and the rear frame 120. Of course, according to the selection based on the actual situation and specific needs, other methods can also be used to fix the lenses 300 on the frame 100, which are not uniquely limited here.

Specifically, as shown in FIG. 2, the front frame 110 has a slot 111, and the rear frame 120 has a snap 121, with the snap 121 snapped and connected into the slot 111. This structure can reduce the assembly difficulty of the liquid crystal dimming eyeglasses and improve the assembly efficiency. Of course, according to the selection based on the actual situation and specific needs, it can also be that the rear frame 120 has a slot, and the front frame 110 has a snap, with the snap snapped and connected into the slot.

Specifically, as shown in FIG. 2, the liquid crystal dimming eyeglasses also include temples 200 and a battery 800. The temples 200 are hinged to the frame 100, and both the circuit board 500 and the battery 800 are located within the temples 200, with the battery 800 electrically connected to the circuit board 500. This structure can hide the circuit board 500 and the battery 800 inside the temples 200, thereby protecting the circuit board 500 and the battery 800.

Figure 6:
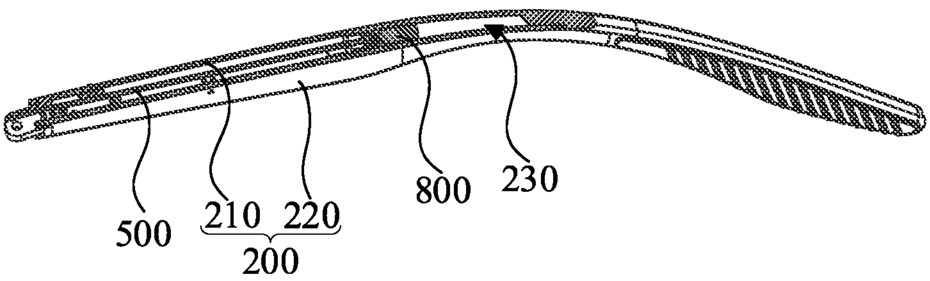
FIG. 6 is a schematic diagram of the cross-sectional structure of the temples in the first embodiment of this application.
Figure 7:
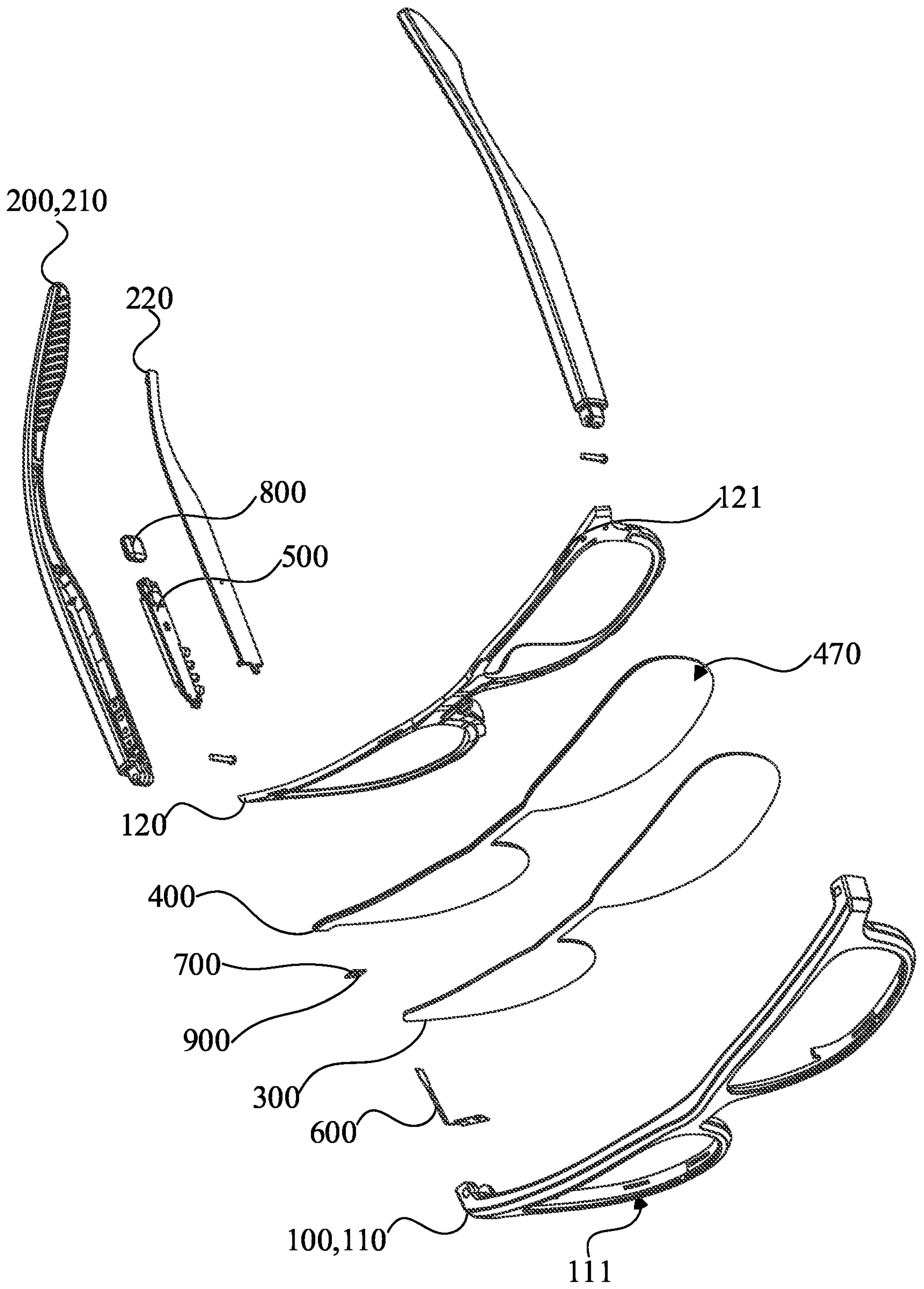
FIG. 7 is an exploded structural schematic diagram of the liquid crystal dimming eyeglasses of the second embodiment of this application.
Figure 8:
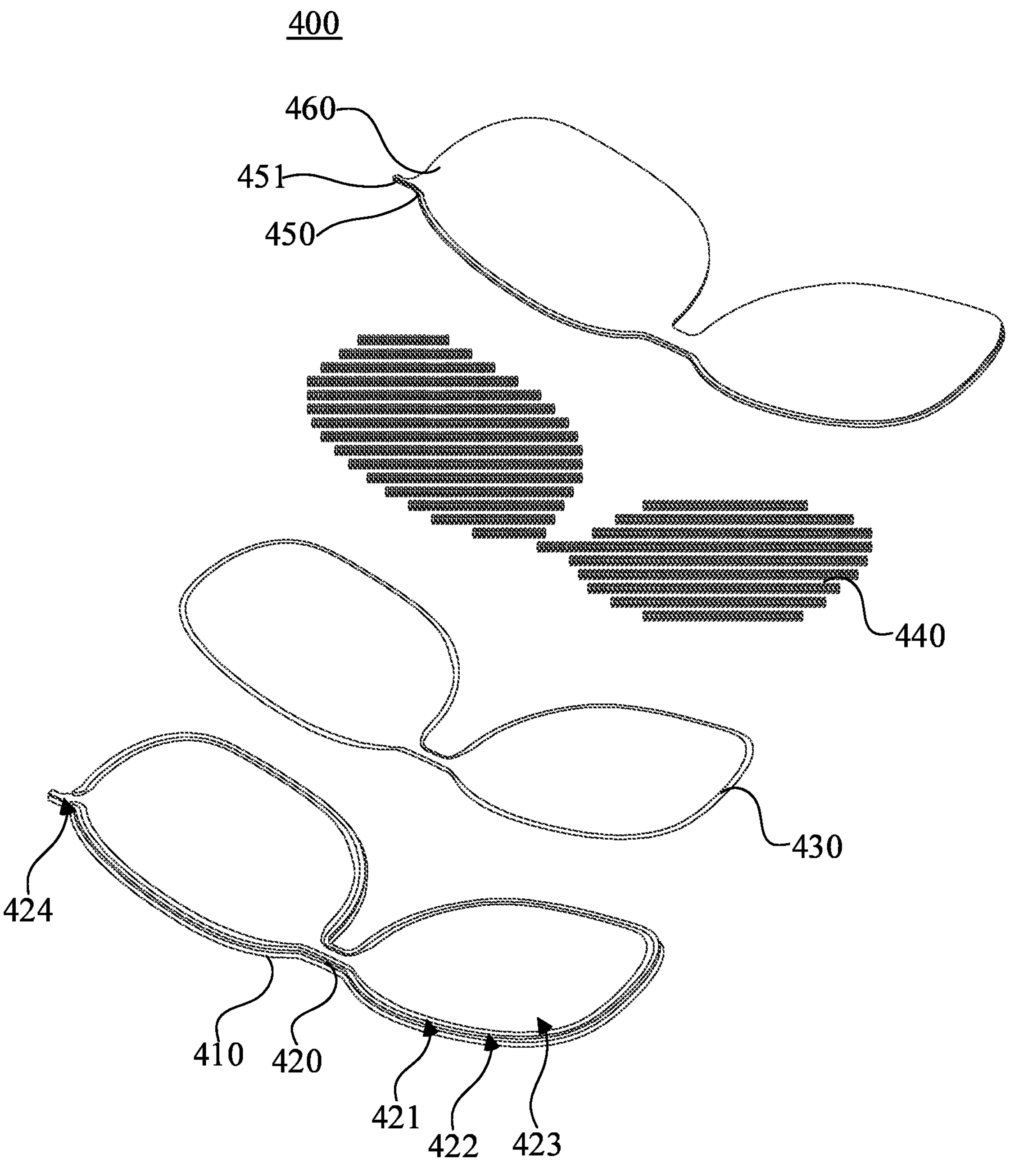
FIG. 8 is an exploded structural schematic diagram of the liquid crystal film of the second embodiment of this application.
Figure 9:
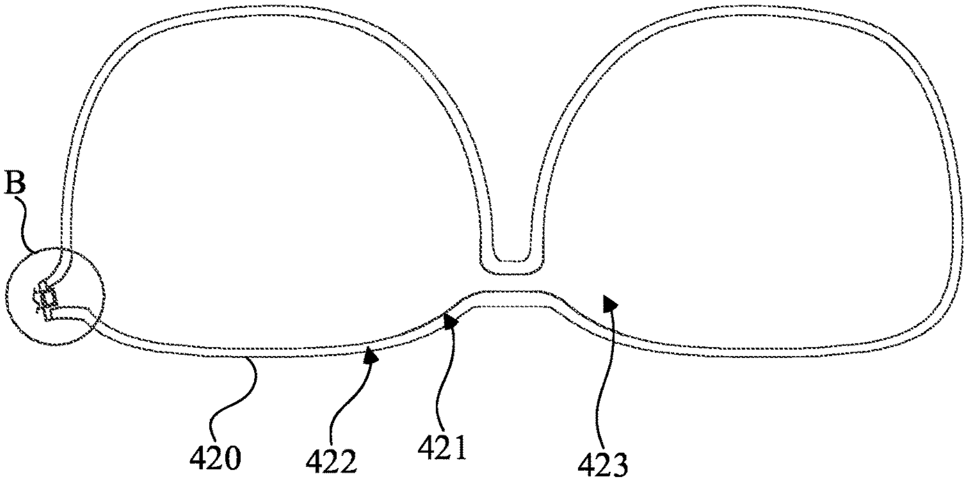
FIG. 9 is a plan schematic diagram of the first conductive layer, the first conductive adhesive, and the wiring of the second embodiment of this application.
Figure 10:
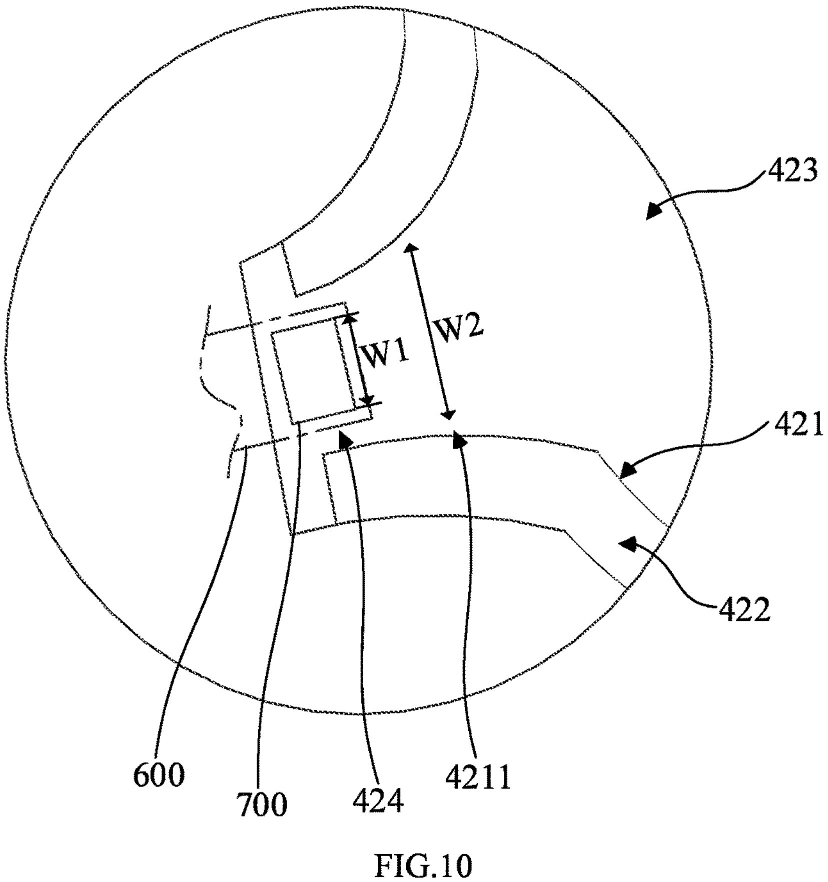
FIG. 10 is an enlarged schematic diagram of Area B in FIG. 9.
Figure 11:
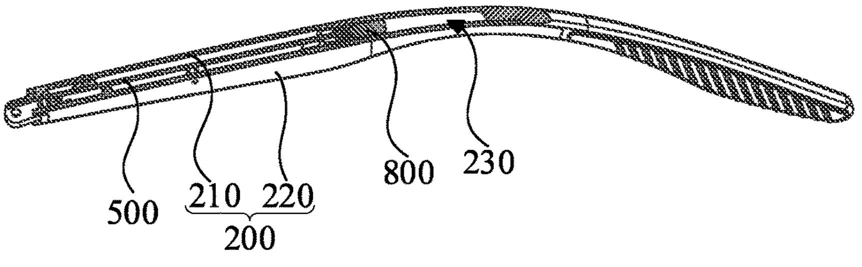
FIG. 11 is a schematic diagram of the cross-sectional structure of the temples in the second embodiment of this application.

Specifically, as shown in FIG. 2 and FIG. 6, at least one of the temples 200 includes a body 210 and a cover 220. The body 210 is hinged to the frame 100, and the cover 220 is assembled to the body 210. The body 210 and the cover 220 together enclose to form a housing cavity 230, with the circuit board 500 and the battery 800 located within the housing cavity 230.

Embodiment 2

Please refer to FIG. 1 as well as FIGS. 7 to 11, the second embodiment of this application provides a liquid crystal dimming eyeglasses, which mainly differs from the first embodiment in that: the liquid crystal dimming eyeglasses include one lens 300 and one liquid crystal film 400. The liquid crystal film 400 is attached to the lens 300, and the liquid crystal film 400 has two light-transmitting areas 470. These two light-transmitting areas 470 correspond respectively to the left and right eyes of the wearer.

It should be noted that the technical solutions of the various embodiments of this application can be combined with each other. However, such combinations must be based on what can be implemented by those skilled in the art. When the combination of technical solutions results in contradictions or impracticalities, such combinations should be considered non-existent and are not within the scope of protection sought by this application.

The above descriptions are only some or preferred embodiments of this application. The scope of protection of this application should not be limited to the text or the drawings. Any equivalent structural modifications made under the overall concept of this application, utilizing the content of the specification and the drawings, or directly/indirectly applied in other related technical fields, are included within the scope of protection of this application.

What is claimed is:

1. A liquid crystal dimming eyeglasses, comprising:

a frame;

one or more lenses, positioned in the frame;

one or more liquid crystal films, attached to the lenses, each of the liquid crystal film comprising a first conductive layer, a second conductive layer, and a liquid crystal layer, wherein the first conductive layer and the second conductive layer are arranged opposite to each other; the first conductive layer has an inner ring portion, an outer ring portion, and an etched portion, the outer ring portion partially surrounds the inner ring portion, the etched portion is located between the inner ring portion and the outer ring portion, the inner ring portion and the outer ring portion are insulated from each other by the etched portion, the liquid crystal layer is located between the inner ring portion and the second conductive layer; and a circuit board, electrically connected to the inner ring portion and the second conductive layer, respectively;

a wiring, at least partially positioned within the frame, the circuit board is electrically connected to the inner ring portion and the second conductive layer through the wiring;

wherein the first conductive layer has a first binding part, the etched portion has an opening, the first binding part is correspondingly arranged to the opening, the first binding part is electrically connected to the inner ring portion; the liquid crystal dimming eyeglasses further comprise a first conductive adhesive, the wiring is bound to the first binding part through the first conductive adhesive;

the second conductive layer has a second binding part, the liquid crystal dimming eyeglasses further comprise a second conductive adhesive, and the wiring is bound to the second binding part through the second conductive adhesive.

2. The liquid crystal dimming eyeglasses according to claim 1, wherein a width of the first conductive adhesive is less than a width of the opening.

3. The liquid crystal dimming eyeglasses according to claim 2, wherein the frame comprises a front frame and a rear frame, the front frame is assembled to the rear frame, and the lens is held between the front frame and the rear frame.

4. The liquid crystal dimming eyeglasses according to claim 1, wherein the liquid crystal film further comprises sealing frame adhesive, the sealing frame adhesive is located between the first conductive layer and the second conductive layer, the sealing frame adhesive is arranged around the liquid crystal layer; a part of the etched portion is arranged to correspond to the sealing frame adhesive, and another part of the etched portion extends to an outside of the sealing frame adhesive.

5. The liquid crystal dimming eyeglasses according to claim 4, wherein the frame comprises a front frame and a rear frame, the front frame is assembled to the rear frame, and the lens is held between the front frame and the rear frame.

6. The liquid crystal dimming eyeglasses according to claim 1, wherein the one or more lenses include two lenses and the one or more liquid crystal films include two liquid crystal films, the two lenses are spaced apart from each other in the frame, the two lenses and the two liquid crystal films correspond one to one, and each of the two liquid crystal films is attached to a corresponding one of the two lenses; or the one or more lenses include one lens and the one or more liquid crystal films include one liquid crystal film, the liquid crystal film is attached to the lens, the liquid crystal film has two light-transmitting areas, and the two light-transmitting areas correspond respectively to left and right eyes of a wearer.

7. The liquid crystal dimming eyeglasses according to claim 1, wherein the frame comprises a front frame and a rear frame, the front frame is assembled to the rear frame, and the lens is held between the front frame and the rear frame.

8. The liquid crystal dimming eyeglasses according to claim 7, wherein one of the front frame and the rear frame has a slot, another one of the front frame and the rear frame has a snap, and the snap is snapped and connected into the slot.

9. The liquid crystal dimming eyeglasses according to claim 1, further comprising:

temples, hinged to the frame, the circuit board is located within the temples; and a battery, located within the temples, the battery is electrically connected to the circuit board.

10. The liquid crystal dimming eyeglasses according to claim 9, wherein the temples comprise a body and a cover, the body is hinged to the frame, the cover is assembled to the body, the body and the cover together form a housing cavity, and the circuit board and the battery are located within the housing cavity.

* * * * *